United States Patent [19]

White et al.

[11] 4,438,503
[45] Mar. 20, 1984

[54] WAVEFORM SYNTHESIZERS

[75] Inventors: Robert A. White, Shepperton; Ralph W. Yell, Hampton, both of England

[73] Assignee: The Secretary of State, London, England

[21] Appl. No.: 263,202

[22] Filed: May 13, 1981

[30] Foreign Application Priority Data

May 13, 1980 [GB] United Kingdom ................. 8015877

[51] Int. Cl.³ .............................................. G06F 15/31
[52] U.S. Cl. ...................................... 364/721; 364/718
[58] Field of Search ............... 364/721, 720, 719, 718; 328/14; 84/1.01

[56] References Cited

U.S. PATENT DOCUMENTS

| 3,813,528 | 5/1974 | Blanding | 364/721 |
| 3,822,380 | 7/1974 | Forgione | 364/718 |
| 3,925,781 | 12/1975 | Hulett et al. | 343/106 R |
| 4,171,466 | 10/1979 | Carbrey | 364/721 X |
| 4,338,674 | 7/1982 | Hamada | 364/718 |

FOREIGN PATENT DOCUMENTS

| 935529 | 8/1963 | United Kingdom . |
| 1259360 | 1/1972 | United Kingdom . |
| 1281660 | 7/1972 | United Kingdom . |
| 1527709 | 10/1978 | United Kingdom . |
| 2002616A | 2/1979 | United Kingdom . |
| 1545951 | 5/1979 | United Kingdom . |
| 2040636A | 8/1980 | United Kingdom . |

Primary Examiner—David H. Malzahn
Attorney, Agent, or Firm—Cushman, Darby & Cushman

[57] ABSTRACT

The invention facilitates the calibration of VOR equipment by synthesis of a series of waveforms representative of different positions in azimuth.

Digital data representative of a frequency modulated component of the VOR waveform is stored in a first memory area (1) and digital data representative of an added sine wave component of the waveform is stored in a second memory area (2). By appropriate cyclic data retrieval from the memory areas and combination of the data (7) together with digital to analogue conversion (8) and filtering (10) the VOR waveform corresponding to a particular azimuth may be synthesized.

14 Claims, 5 Drawing Figures

WAVEFORM SYNTHESIZERS

This invention relates to a waveform synthesizer for the calibration of very-high-frequency omnidirectional radio range equipment, hereinafter referred to as VOR.

The VOR system is a navigation aid for operational aircraft in which two co-originating audio signals are caused to have a phase relationship which varies in azimuth. One signal has a constant phase throughout the 360° of azimuth and is called the reference phase, the other signal varies in phase with azimuth and is called the variable phase. The aircraft sited receiver determines the position of the aircraft in azimuth by measuring the phase difference between the receiver audio signals.

In a practical system a 9960 Hz signal has been frequency modulated with 30 Hz together with a second 30 Hz added sine wave signal. The phase shift between the 30 Hz signals is one cycle for 360° rotation. The composite 9960 Hz signal modulates a VHF carrier and is transmitted.

The present invention seeks to provide a means of calibration of the radial parameter of either a VOR audio signal generator used for testing aircraft receivers or an aircraft VOR receiver whilst the aircraft is on the ground.

According to the invention a waveform synthesiser for calibrating VOR equipment includes a memory which has two separately addressable areas, a first area containing a group of digital data representative of a frequency modulated component of a standard VOR waveform and a second area containing a group of digital data representative of an added sine wave component of the standard VOR waveform; a cyclic memory addressor with an address rate controlled by a clock so as to generate a digital data output stream from the memory, and an azimuth selector so connected and arranged as to generate from an address to the first memory area, in accordance with the selected azimuth, a modified address to the second memory area; and a converter, which includes a combiner for combining data retrieved from the memory areas, which converts the digital data output stream to a discrete analogue output stream and filters the discrete analogue output stream, the converter being so connected and arranged as to provide an analogue waveform suitable for connection to a VOR equipment.

Advantageously the memory is read only memory, and desirably the azimuth selector is an array of switches.

Advantageously the combiner may be arranged to add together digital data retrieved from the first and second memory areas before conversion of the data to analogue form by the converter.

Alternatively the combiner may be arranged to add together analogue forms to generate a single analogue form after the converter has converted digital data retrieved from the first and second memory areas to two anlogue forms.

Preferably the converter is arranged to provide buffering and amplification of the analogue waveform before connection to the VOR equipment.

The invention will now be further described, by way of example only, with reference to the accompanying drawings of which:

Figure 1:
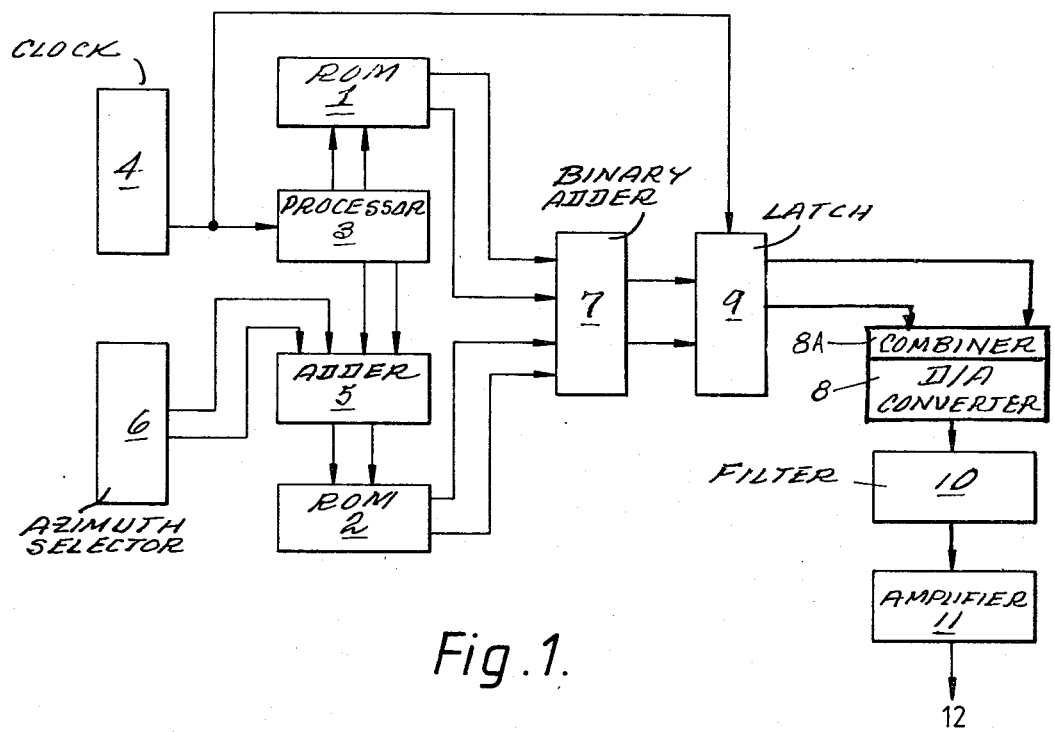
FIG. 1 is a block schematic representation of an aircraft VOR calibration apparatus.

In FIG. 1 two read only memory areas 1, 2, hereinafter referred to as ROM 1 and ROM 2, are programmed with digital data which has been generated by a computer. The digital data is generated in the computer by: a first algorithm which calculates the instantaneous amplitude of a frequency modulated sinusoidal 30 Hz waveform and a 9960 Hz carrier; and a second algorithm which calculates the instantaneous amplitude of a sinusoidal waveform having a frequency of 30 Hz, which when added to the frequency modulated waveform produces an instantaneous amplitude corresponding to a waveform such as would normally be received by an aircraft VOR equipment, after demodulation of the vhf carrier. The first algorithm expresses the amplitude of the frequency modulated waveform ($a_{fm}$) as a function of time (t), carrier frequency ($\omega_c$), modulation frequency ($\omega_s$), frequency modulation depth (afc/fs) and an amplitude constant A.

The first algorithm may be written as:

$$a_{fm} = A \sin(\omega_c t - afc/fs \cos \omega_s t)$$

The second algorithm expresses the amplitude of the added sine wave ($a$add) as a function of modulation frequency, time and an amplitude constant B. The second algorithm may be written as:

$$a_{add} = B \sin \omega_s t$$

In practice each algorithm has a constant added to it to make all values generated positive. Each value of instantaneous amplitude so generated is in digital form and is stored in ROM 1 or ROM 2 first and second memory areas, respectively. The size of ROM 1, which determines the accuracy with which the waveform can be generated, is chosen to be 7200 bytes. Each byte is made up of 12 bits.

An addressor 3 can access each storage location within ROM 1 in a predetermined manner and at a rate determined by pulses supplied from a clock 4. The pulse rate is set so that a complete address cycle takes 1/30th second, or one complete cycle of the 30 Hz signal.

An azimuth selecter which consists of a set of thumb wheel switches 6 and an adder 5, also has an input from the addresser 3. The adder 5 adds the input from addresser 3 to a preset binary phase shift signal from the thumb wheels 6. If the phaseshift signal is zero then the ROM 2 is addressed at the same point in the address cycle as ROM 1. If the phaseshift signal has a value other than zero then the point in the address cycle of ROM 2 is incremented by the value of the phaseshift signal, relative to the point in the address cycle of ROM 1.

The two binary values generated by addressing ROM 1 and ROM 2 are input to a binary adder 7 which outputs to a digital to analogue converter 8, hereinafter referred to as the DAC. A latch 9 is used to transmit signal data to the DAC according to the clock pulse rate. The converter 8 incorporates a combiner 8A arranged to add together digital data retrieved from the first and second memory areas before the conversion of the data to analog form.

Figure 2:
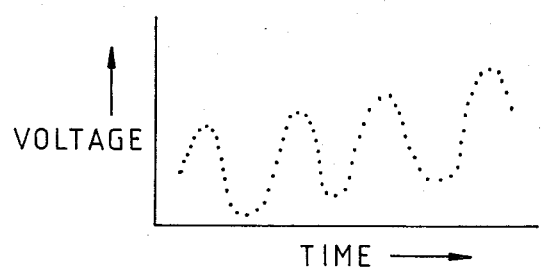
FIG. 2 is a graphical representation of the variation in amplitude of a series of discrete analogue signals with time.

FIG. 2 is a graphical representation of the variation in the analogue output of the DAC with time. The output is in the form of a series of discrete points with approximately 30 such points making up one complete oscillation at 9960 Hz.

Figure 3:
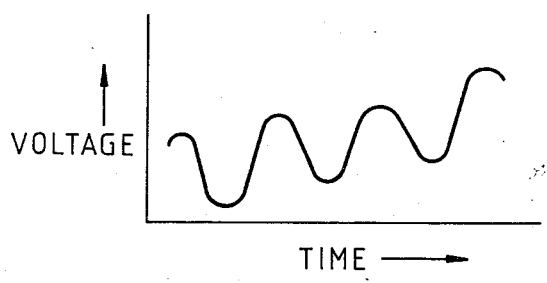
FIG. 3 is a graphical representation of the variation in amplitude of a filtered signal with time.

The analogue signal is passed through a filter 10 which has a twofold effect, making the waveform continuous, and removing high frequency harmonics. The filtered waveform is illustrated in FIG. 3. The filtered signal is amplified in amplifier 11 and is then output via leads 12 which are, in calibration use, connected to the input of an aircraft VOR equipment or to the input of a calibration equipment.

Figure 4:
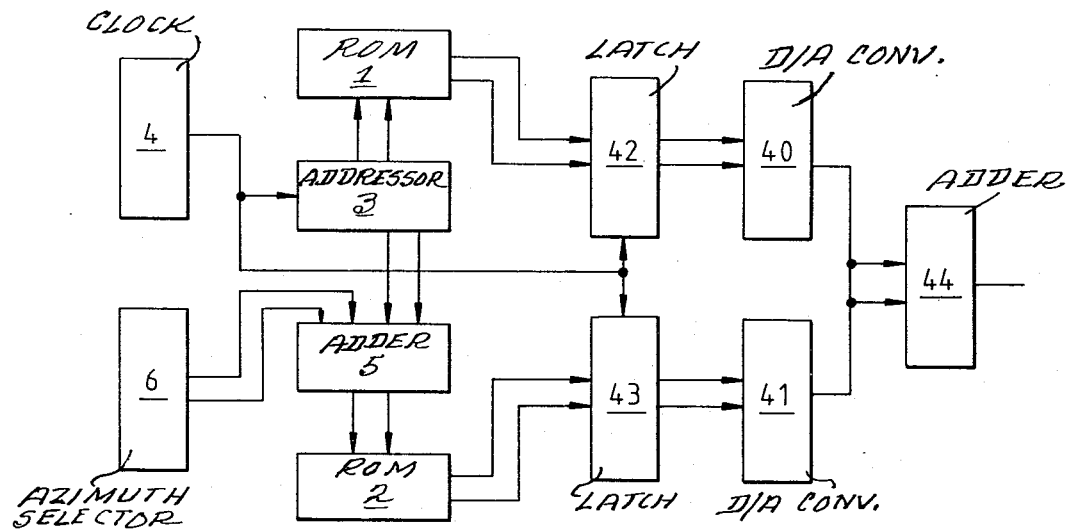
FIG. 4 is a block schematic representation of a modification of an aircraft VOR calibration apparatus.

FIG. 4 shows a modification of the invention in which ROM 1, ROM 2, address 3, clock 4, adder 5 and thumb-wheels 6 are the same as in the unmodified invention hereinbefore described. ROM 1 and ROM 2 each output to an associated DAC 40, 41 through latches 42 and 43 which are controlled by the clock 4. The analogue signals from DAC 40 and DAC 41 are added together in an analogue adder 44. The output of analogue adder 44 is transmitted to the filter (not shown).

Figure 5:
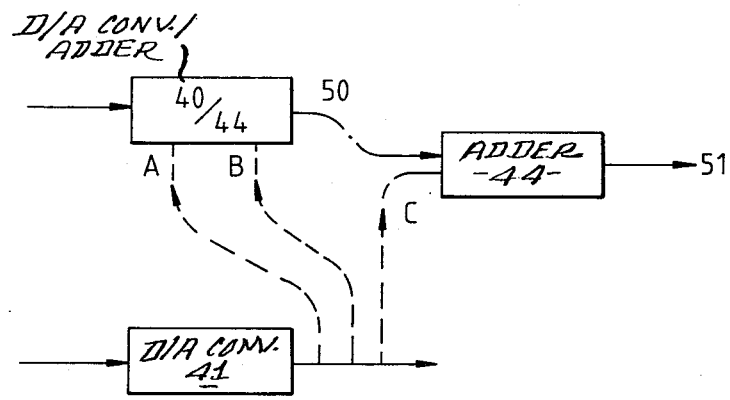
FIG. 5 is a fragmentary block schematic representation of a modification of an aircraft VOR calibration apparatus showing three possible arrangements capable of effecting analogue addition and subtraction.

Three possible arrangements for the DAC 40, DAC 41 and analogue adder 44 are shown in FIG. 5. In the first arrangement a connection A is made from the output of DAC 41 to the reference input of DAC 40, in the second arrangement a connection B is made from the output of DAC 41 to the offset input of DAC 40, in both of these arrangements the DAC 40 acts as the analogue adder 44, providing an analogue sum signal 50. In the third arrangement the outputs of DAC 40 and DAC 41 are input to a separate analogue adder 44 which then outputs the analogue added combiner signal 51.

In the third arrangement the analogue adder used is an operational amplifier. In order for the first or second arrangements to be successful the input of DAC 40 must give a linear response over the entire range used, a multiplying DAC is therefore chosen. A second filter (not shown) may be interposed between DAC 41 and DAC 40 to make the input to the latter more continuous and thereby reduce possible errors.

As the waveform is generated digitally errors are introduced primarily from the filter 10. The errors are due to two main factors:

(i) The differential phase shift of the two extremes of the frequency modulated 9960 Hz signal.
(ii) The differential phase shift between the two extremes of the 30 Hz added signal and the nominal 9960 Hz signal.

In practice the extremes of the frequency range are sufficiently close to make the error due to (i) negligible, the frequency modulation depth required being only 480 Hz.

The error due to (ii) may be almost eliminated by careful design and construction of the filter and the remaining small error calculated out by comparison techniques.

Preferably the converter, including elements 8, 40 and 41 is arranged to provide buffering of the analog waveform before connection to VOR equipment through filter 10 and amplifier 11.

We claim:

1. A waveform synthesizer for calibrating VOR equipment, comprising:
   a memory having first and second separately addressable areas, the first area having digital data stored therein representing a frequency modulated component of a standard VOR waveform and the second area having digital data stored therein representing an added sine wave component of a standard VOR waveform;
   azimuth selector means, adapted to be manipulated by an operator, for selecting an azimuth to be simulated by said synthesizer;
   a cyclic memory addressor, coupled to said azimuth selector means and to said memory, for (a) addressing the first and second memory areas, the address of the second area being offset by an amount related to the azimuth selected via said azimuth selector means and (b) providing digital data read from said first and second memory areas defining a waveform to be synthesized;
   converter means, coupled to said cyclic memory addressor, for converting said digital data read from said first and second memory areas into an analog signal of a form suitable for coupling to said VOR equipment.

2. A waveform synthesizer according to claim 1 wherein said converter means comprises means for digitally combining data read from said first and second memory areas to form combined digital data which is then converted into analog form.

3. A waveform synthesizer according to claim 1 wherein said converter mean comprises:
   means for digitally combining data read from said first and second memory areas;
   means for analog converting the combined data; and
   means for filtering the analog converted combined data to form the synthesized waveform.

4. A waveform synthesizer according to claim 1 wherein said first memory area is a Read Only Memory (ROM).

5. A waveform synthesizer according to claim 4 wherein said second memory area is a Read Only Memory (ROM).

6. A waveform synthesizer according to claim 1 wherein said second memory area is a Read Only Memory (ROM).

7. A waveform synthesizer according to claim 1 wherein said azimuth selector means comprises a plurality of switches coupled to said cyclic memory addressor.

8. A waveform synthesizer according to claim 1 wherein said cyclic memory addressor comprises:
   a cyclic address generator for generating a stream of addresses;
   means for coupling said stream of addresses to said first memory area;
   modifying means, coupled to said cyclic address generator and to said azimuth selector means, for modifying the address stream in accordance with the azimuth specified by said azimuth selector means and generating a modified address stream; and
   means for coupling said modified address stream to said second memory area.

9. A waveform synthesizer according to claim 1 wherein said converter means comprises:
   a binary adder for adding data read from said first memory area to provide first memory binary data and for adding data read from said second memory area to provide second memory binary data;

a latch for latching said first memory binary data and said second memory binary data from said binary adder;

a combiner, coupled to said latch, for combining said first and second memory binary data to provide combined digital data;

a digital to analog (D/A) converter for converting combined digital data from said combiner into an analog form; and a filter for smoothing an analog form signal provided by said D/A converter.

10. A waveform synthesizer according to claim 1 wherein said converter means comprises:

a first latch for latching data read from said first memory area;

a first digital/analog (D/A) converter for analog converting data latched by said first latch;

a second latch for latching data from said second memory area;

a second digital/analog (D/A) converter for analog converting data latched by said second latch; and an adder for combining the analog converted data from said first and second D/A converters.

11. A method of waveform synthesis, for use in calibrating VOR equipment comprising the steps of:

storing in a first memory area digital data representative of a frequency modulated component of a standard VOR waveform, and in a second memory area digital data representative of an added sine wave component of the standard VOR waveform;

addressing said first and second memory areas in a cyclic fashion and in accordance with a desired azimuth to be incorporated into the synthesized waveform; and combining data read from said first and second memory areas in accordance with said addressing step and generating therefrom an analog waveform suitable for connection to a VOR equipment.

12. A method according to claim 11 wherein the combining step comprises the steps of reading digital data from said memory areas, digitally combining the read digital data and then converting the combined digital data into analog form.

13. A method according to claim 11 in which the combining step comprises the steps of converting digital data read from each memory area into analog form, and then combining the analog forms into a single synthesized waveform.

14. A method according to claim 11 further including the steps of buffering and amplifying the analog waveform before connection to the VOR equipment.

* * * * *